United States Patent
Pizot et al.

(10) Patent No.: US 9,092,180 B2
(45) Date of Patent: Jul. 28, 2015

(54) PRINTER-SERVER CONNECTIONS

(71) Applicant: Hewlett-Packard Development Company, L.P., Houston, TX (US)

(72) Inventors: Laurent Pizot, Camas, WA (US); Sudhindra Venkatesh Kulkarni, Bangalore Karnataka (IN); Rodney Hofer, Vancouver, WA (US); Nikhilesh Gargi, Gurgaon Haryana (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 80 days.

(21) Appl. No.: 13/749,341

(22) Filed: Jan. 24, 2013

(65) Prior Publication Data
US 2014/0204412 A1   Jul. 24, 2014

(51) Int. Cl.
G06F 3/12 (2006.01)
G06K 15/00 (2006.01)

(52) U.S. Cl.
CPC .................................. G06F 3/1296 (2013.01)

(58) Field of Classification Search
None
See application file for complete search history.

(56) References Cited

U.S. PATENT DOCUMENTS

| | | |
|---|---|---|
| 7,136,645 B2 | 11/2006 | Hanson et al. |
| 2012/0179802 A1 | 7/2012 | Narasimhan et al. |
| 2012/0188600 A1 | 7/2012 | Oshima et al. |
| 2012/0194864 A1* | 8/2012 | Oshima et al. ............... 358/1.15 |
| 2012/0206765 A1 | 8/2012 | Nakajo et al. |
| 2013/0060950 A1* | 3/2013 | Furuta et al. .................. 709/227 |

OTHER PUBLICATIONS

"Google Cloud Print Job Notifications Using XMPP" Feb. 28, 2011, Virtual Cloud News, Retrieved from the Internet on Jan. 17, 2013 http://virtualcloudnews.com/?category_name=extensible-messaging-and-presence-protocol>, 2 Pages.

* cited by examiner

*Primary Examiner* — Thomas Lett
(74) *Attorney, Agent, or Firm* — Hewlett-Packard Patent Department

(57) ABSTRACT

A plurality of printing devices are connected to a cloud server via a persistent connection. The cloud server identifies at least one inactive printing device and provides the at least one inactive printing device with non-persistent connection information via the persistent connection. A polling message is received from the at least one inactive printing device via the non-persistent connection. The cloud server indicates when the at least one inactive printing device is to return to an active state.

20 Claims, 4 Drawing Sheets

PRINTER-SERVER CONNECTIONS

BACKGROUND

Advances in technology have resulted in the development of printing technologies for mobile computing devices, such as smartphones, tablet computers, and laptops. Such printing technologies use cloud resources to provide mobile printing capabilities for printers, multifunction printers (MFPs), all-in-ones (AIOs), and other web connected printing devices.

BRIEF DESCRIPTION OF THE DRAWINGS

The following detailed description references the drawings, wherein.

DETAILED DESCRIPTION

Figure 1:
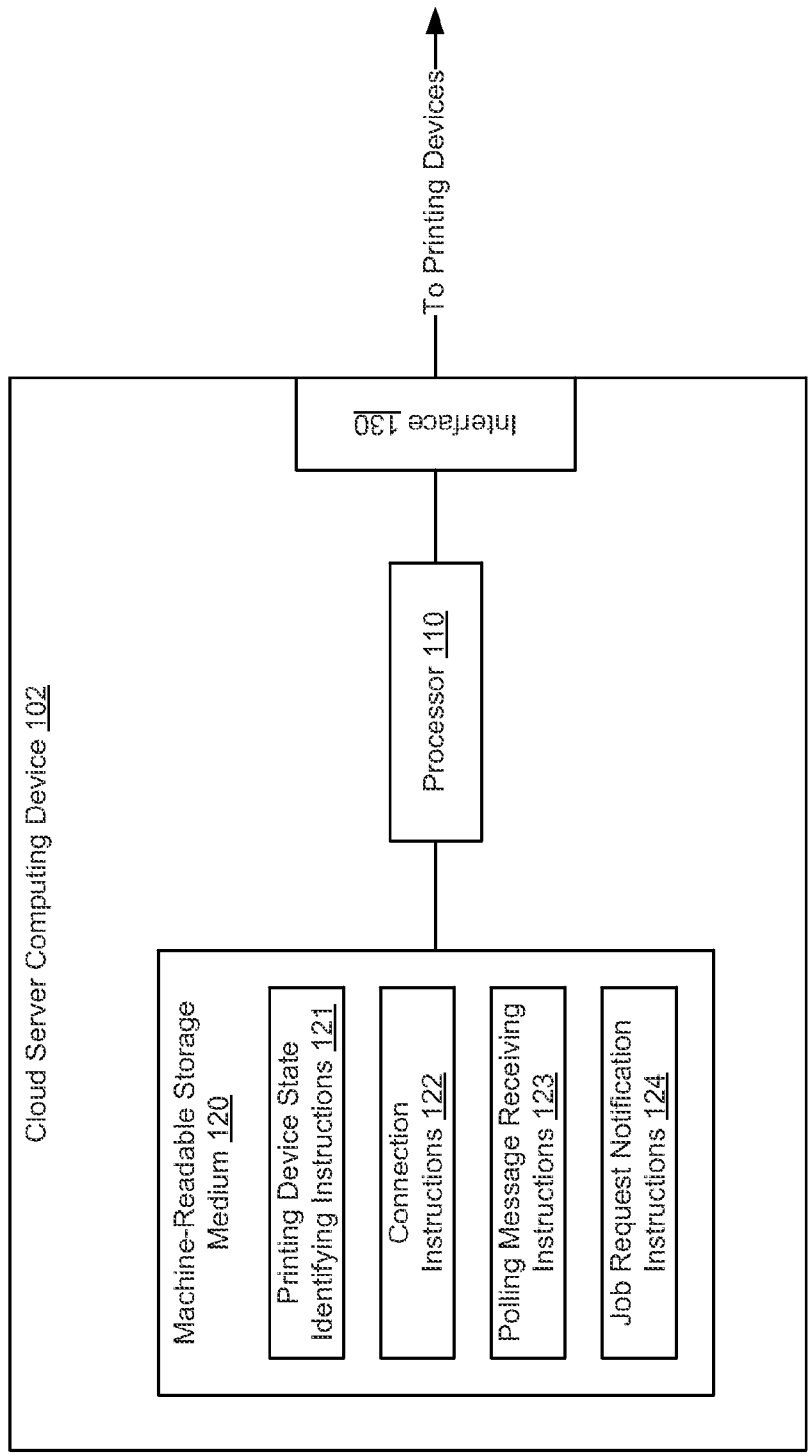
FIG. 1 is a block diagram of a cloud server computing device, according to one example.

Various aspects of the present disclosure are directed to establishing connections between a cloud server and a plurality of printing devices. More precisely, various aspects of the present disclosure are directed to switching between a persistent connection and a non-persistent connection (e.g., a polling based connection) based on a state (active or inactive) of printing devices connected to the cloud server. For example, when the printing device is in an active state, a persistent connection (e.g., a secure extensible messaging and presence protocol (XMPP) connection) may be established and maintained. However, when the printing device is in an inactive state (e.g., no pending job requests or instructions), the connection may be switched to a non-persistent connection (e.g., a polling based connection using a hypertext transfer protocol (HTTP) uniform resource locator (URL)).

Printing technologies (e.g., Hewlett-Packard's ePrint) enable users to print from virtually anywhere to a printing device that supports such printing technologies. Once enabled, an email address is assigned to the user's printing device. To print, the user simply sends an email containing the user's document to the printing device's address. Accordingly, such printing technologies provide a mechanism for cloud solutions to be delivered to web (e.g., Internet) connected printing devices. The cloud solutions include printing, scanning, and managing of printing devices from the cloud. A key mechanism for the delivery of notifications to the printing device for the cloud solutions is a persistent connection between the printing devices and the cloud infrastructure (e.g., a cloud server computing device). This persistent connection enables consumer printing devices which are bound by firewall to be accessible from a public cloud server as well.

However, persistent connections provide a scale challenge to the cloud server infrastructure and further limit the ability of the printing devices to enter sleep mode due to the network being active. For example, when a persistent connection is established between the cloud server and multiple printing devices, active and inactive printing devices are provided with the same service level which results in a degraded service to active printing devices (i.e., devices that actually need the persistent connection when the number of inactive printing devices is high. Further, because the persistent connection between the cloud server and the printing devices is secure, connection and management information may not be offloaded or distributed to a third party content delivery network (CDN) due to confidentiality of the protocol packets exchanged. Thus, the load on the cloud server may not be distributed.

Accordingly, examples disclosed herein provide a solution for switching between a persistent connection to a non-persistent connection (e.g., a polling based protocol) when one or more printing devices are inactive and back to the persistent connection when an activity is detected for the one or more printing devices. The disclosed solution provides flexibility to the cloud server according to activity for the printing devices, compared to an approach where a static persistent connection is maintained. The solution further facilitates inactive printing devices to switch to a sleep mode since the polling protocol is a light weight protocol that can run when the printing devices are in the sleep mode. Further, the solution enables the cloud server to offload the inactive printing devices to a CDN. For example, the HTTP URL provided to the inactive printing devices can be served by the CDN, thereby maximizing the resources of the cloud server (e.g., by serving only the active printing devices).

In one example, a cloud server computing device includes a processor to identify at least one inactive printing device having a persistent connection with the cloud server computing device. The processor is further to provide the at least one inactive printing device with non-persistent connection information via the persistent connection, and receive a polling message from the at least one inactive printing device via the non-persistent connection. The processor is to send an instruction to the at least one inactive printing device to return to an active state when a job request is available for the at least one inactive printing device.

In another example, a method of establishing a connection between a cloud server and a plurality of printing devices includes identifying at least one inactive printing device having a persistent connection with the cloud server. The method includes providing the at least one inactive printing device with non-persistent connection information via the persistent connection, and receiving a polling message from the at least one inactive printing device via the non-persistent connection. The method further includes sending a bitmap to the at least one inactive printing device, in response to receiving the polling message. The bitmap includes at least one bit to indicate when the at least one inactive printing device is to become active and switch to the persistent connection, where the bitmap is sent via the non-persistent connection.

In another example, a non-transitory computer-readable medium may include instructions that, when executed by a processor in a cloud server, cause the cloud server to identify at least one inactive printing device having a persistent connection with the cloud server. The instructions are executable to provide the at least one inactive printing device with non-persistent connection information via the persistent connection, and receive a polling message from the at least one inactive printing device via the non-persistent connection. The instructions are further executable to send an instruction to the at least one inactive printing device to return to an active state when a job request is available for the at least one inactive printing device.

FIG. 1 depicts a block diagram of a cloud server computing device, according to one example. Cloud server computing device 102 is a cloud infrastructure for providing cloud solutions/services to a plurality of client printing devices. For example, cloud server 102 may provide printing devices with print jobs, scan jobs, facsimile jobs, or remotely manage the plurality of printing devices. Cloud server 102 may be any computing device accessible to the plurality of printing devices, such as printing devices 204a-204n of FIG. 2, over the Internet. In the example of FIG. 1, cloud server 102 includes a processor 110, a machine-readable storage medium 120, and an interface 130.

Processor 110 may be one or more central processing units (CPUs), microprocessors, and/or other hardware devices suitable for retrieval and execution of instructions stored in machine-readable storage medium 120. Processor 110 may fetch, decode, and execute instructions 121, 122, 123, and 124 to enable cloud server 102 switch between a persistent connection and a non-persistent connection with the printing devices based on a state of the printing devices, as described below. As an alternative or in addition to retrieving and executing instructions, processor 110 may include one or more electronic circuits comprising a number of electronic components for performing the functionality of one or more of instructions 121, 122, 123, and 124.

Machine-readable storage medium 120 may be an electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for enabling a switch between a persistent connection and a non-persistent connection based on a state of the printing devices.

Printing device state identifying instructions 121 may identify at least one printing device of the plurality of printing devices that is in an inactive state. For example, one or more printing devices having a persistent connection with the cloud server 102 may become idle or inactive. A persistent connection may include a signaling protocol that uses a persistent communication protocol such as a secure XMPP connection and a secure transmission control protocol (TCP). In certain examples, a printing device may be identified as being inactive when a ping packet is not received from the printing device after a specified duration of time.

Connection instructions 122 may then provide the at least one inactive printing device with non-persistent connection information via the persistent connection. For example, responsive to identifying a printing device that is inactive for a specified duration, the cloud server 102 may provide the inactive printing device with information for establishing a non-persistent connection. The non-persistent connection information is sent to the inactive printing device via the persistent connection. For example, the at least one inactive printing device may be provided with information regarding a polling protocol. In certain examples, the inactive printing device may receive a hypertext transfer protocol (HTTP) uniform resource locator (URL) over the XMPP connection.

Upon receipt of the HTTP URL, the inactive printing device may close the XMPP connection and start polling the cloud server 102 over the polling frequency specified to the inactive printing device in the non-persistent connection information. Because the inactive printing device has closed the persistent XMPP connection, the inactive printing device may enter a sleep mode or a power saving mode to reduce power consumption at the inactive printer. Further, the HTTP URL provided to the inactive printing device may be served by a third party CDN (e.g., an edge server, a proxy server), thereby maximizing the resources of the cloud server 102 to provide services to other printing devices that are active.

Polling message receiving instructions 122 may receive a polling message from the inactive printing device via the non-persistent connection. For example, the inactive printing device may send the polling message in the frequency specified by the cloud server 102. Because the polling protocol is a lightweight protocol, the inactive printing device may send the polling message while operating in a sleep/power saving mode. In certain examples, the inactive printing device may poll to the URL over the frequency specified. In other examples, the polling message comprises an HTTP GET request.

Upon receipt of the polling message, job request notification instructions 124 may send an instruction to the inactive printing device to return to an active state when a job request is available for the inactive printing device. A job request may include a print job, a copy job, a scan job, a facsimile job, a storage job, or a configuration job whereby the cloud server 102 manages one or more configurations/settings of the printing device. In certain examples, the instruction includes a compressed bitmap comprising at least one bit that identifies the inactive printing device. When the at least one bit is set in the bitmap, the inactive printing device is to switch back to the persistent connection (e.g., to receive and/or process a job request).

In some examples, a collection of printing devices (set of printing devices) are represented by a bitmap, where each bit in the bitmap represents a particular printing device. To illustrate, a printing device n in the collection of printing devices may correspond to the $(n+1)^{th}$ bit in the bitmap, where printing device 0 is the first bit in the bitmap. Accordingly, if the bit corresponding to the inactive printing device is set to an enabled status (e.g., '1') in the bitmap, the corresponding inactive printing device sets its firmware to the active state and switches back to the secure persistent connection. In certain examples, the bitmap is compressed with a run length encoding (RLE) scheme.

RLE enables the printing devices to read a partial section of the bitmap without having to decompress the entire bitmap. Moreover, a particular printing device (e.g., the inactive printing device) can stop scanning the RLE contents as soon as it locates its bit position. Further, by using the RLE compressed bitmap, a single URL may be shared by a plurality of printing devices (e.g., millions of printing devices). In other examples, the compressed bitmap may be sent to the CDN for delivery to the inactive printing device. Because an enabled bit in the bitmap causes the inactive printing device to switch to a secure connection, there are no security issues attributable to offloading service by the cloud server 102 to the CDN.

Figure 2:
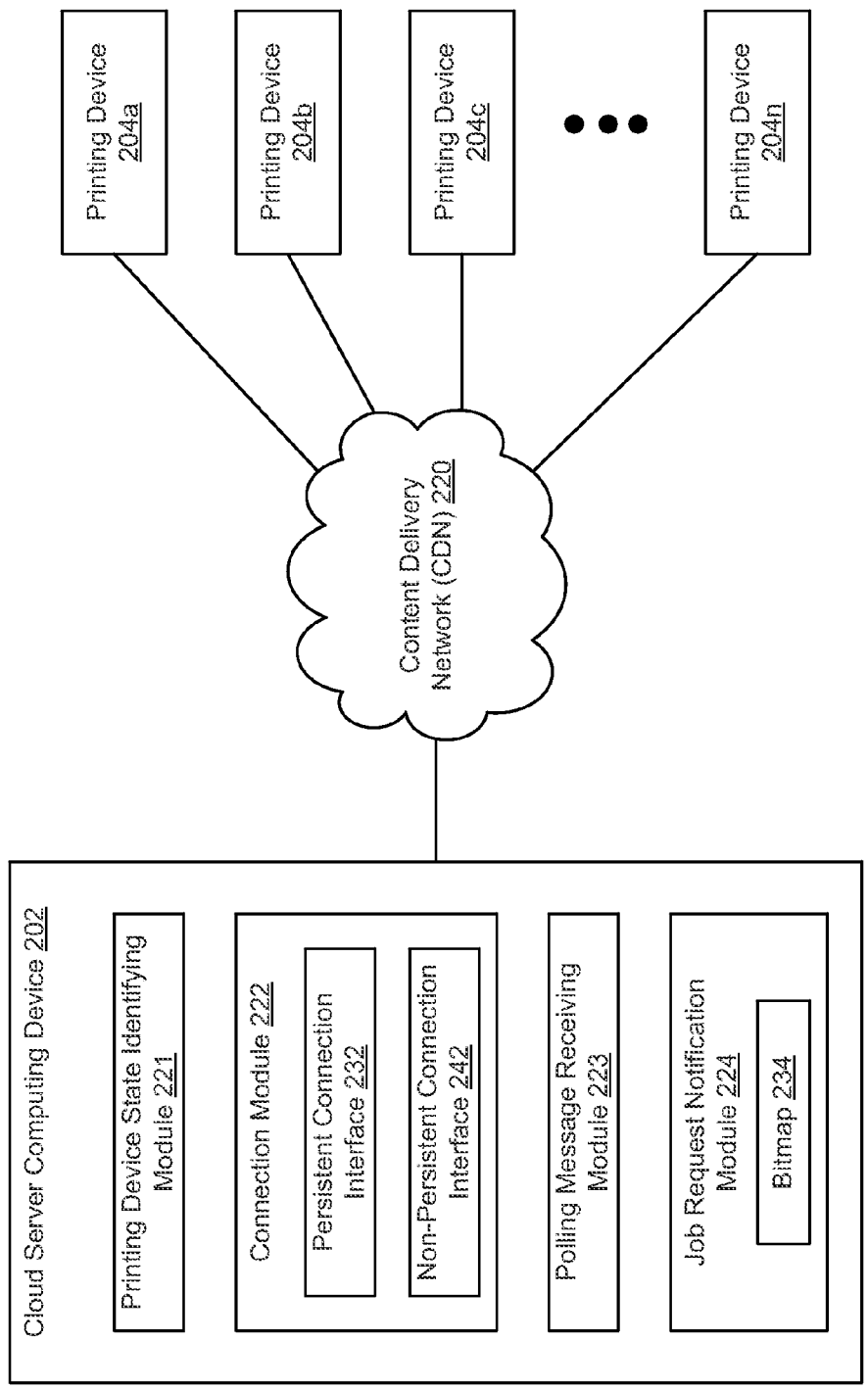
FIG. 2 is a block diagram of a cloud server computing device connected to a plurality of printing devices, according to one example.

FIG. 2 is a block diagram of a cloud server computing device connected to a plurality of printing devices, according to one example. In the example of FIG. 2, cloud server computing device 202 may manage the plurality of printing devices 204a-204n via a content delivery network 220 (e.g., one or more edge servers). In certain examples, cloud server 202 may push the management of printer connections to the CDN 220. For example, cloud server 202 may push the management of inactive printing devices of the plurality of printing devices 204a-204n to the CDN 220, thereby maximizing the resources of the cloud server 202 for active printing devices of the plurality of printing devices 204a-204n.

As illustrated in FIG. 2 and described in detail below, cloud server 202 may include a number of modules 221-224. Each of the modules may include a series of instructions encoded on a machine-readable storage medium and executable by a processor of cloud server 202. In addition or as an alternative, each module may include one or more hardware devices including electronic circuitry for implementing the functionality described below.

As with printing device state identifying instructions 121 of FIG. 1, printing device state identifying module 221 may identify at least one printing device of the printing devices 204a-204n that is in an inactive state. For example, a printing device 204a-204n may be identified as inactive when a ping packet is not received from such printing device 204a-204n at the cloud server 202 after a duration of time, while a persistent connection is established between the printing device 204a-204n and the cloud server 202. To maintain the persistent connection, the cloud server 202 and the printing devices 204a-204n may exchange ping packets at frequent intervals. By identifying inactive printing devices, cloud server 202 may switch from a persistent connection to a non-persistent connection (e.g., a polling based connection) with the identified inactive printing devices and/or push management of the inactive printing devices to the CDN 220.

Connection module 222 may provide the at least one inactive printing device with non-persistent connection information via the persistent connection interface 232. The non-persistent connection information is usable by the inactive printing device for establishing a non-persistent connection with the cloud server 202. For example, the connection module 222 may provide the inactive printing device with a HTTP URL over the persistent connection interface 232. Once the URL reaches the inactive printing device, the inactive printing device may close the persistent connection and start polling to the URL over the polling frequency specified. Moreover, the URL provided to the inactive printing device may be served by the CDN 220 or the cloud server 202. Accordingly, a non-persistent connection may be established between the cloud server 202 and the inactive printing device via the non-persistent connection interface 242.

Polling message receiving module 223 may receive polling messages from the inactive printing device over the non-persistent connection interface 242 at the specified frequency. By implementing a polling protocol, rather than a persistent connection such as a persistent XMPP connection, the inactive printing device may enter a sleep mode to conserve power. In certain examples, the polling message may include an HTTP GET request.

Job request notification module 224 may send a bitmap 234 to the inactive printing device in response to the polling message. If a bit in the bitmap 234 corresponding to the inactive printing device is set (e.g., bit is '1'), then the inactive printing device is to switch to an active state and switch back to the persistent connection. In certain examples, the bitmap 234 is compressed using a RLE encoding scheme.

Figure 3:
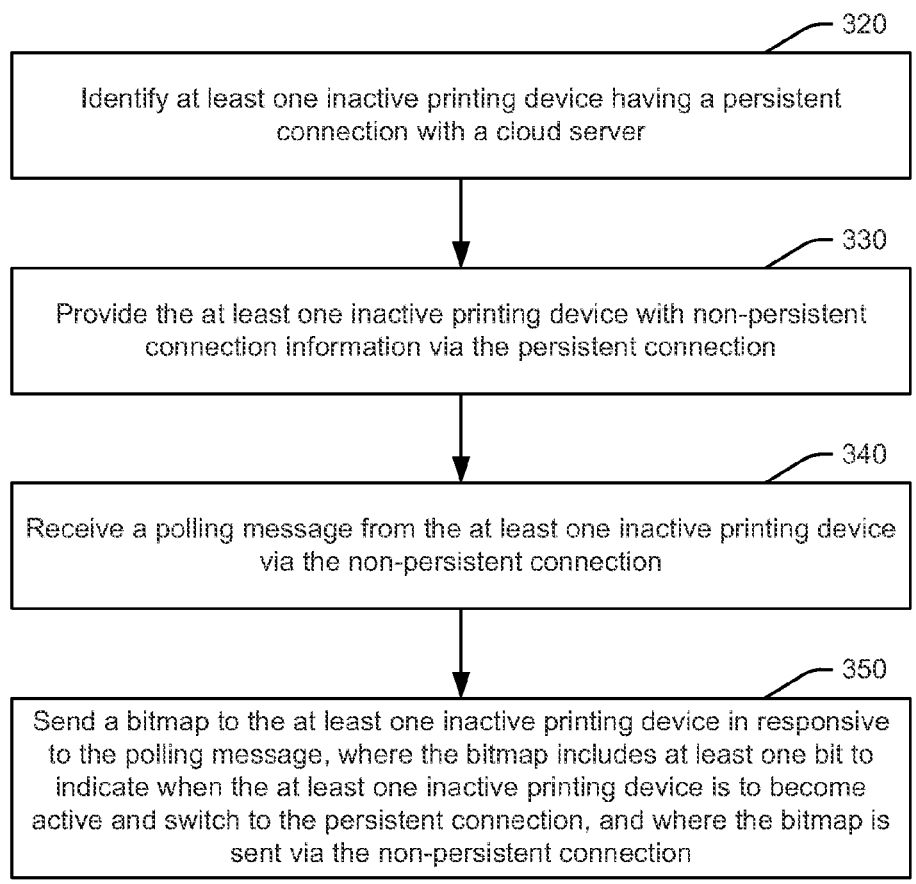
FIG. 3 is a flowchart of a method of establishing a connection between a cloud server and a plurality of printing devices, according to one example.

FIG. 3 is a flowchart of a method of establishing a connection between a cloud server and a plurality of printing devices, according to one example. Although execution of method 300 is described below with reference to the components of cloud servers 102 and 202 of FIGS. 1 and 2, respectively, other suitable components for execution of method 300 will be apparent to those of skill in the art. Additionally, the components for executing method 300 may be spread among multiple devices. Method 300 may be implemented in the form of executable instructions stored on a machine-readable storage medium, such as non-transitory machine-readable storage medium 120 of FIG. 1, and/or in the form of electronic circuitry.

Method 300 includes identifying at least one inactive printing device having a persistent connection with a cloud server, at 320. For example, printing device state identifying instructions 121 of FIG. 1 or printing device state identifying module of FIG. 2 may identify at least one printing device that is inactive. In certain examples, a printing device is identified as inactive when a ping packet is not received from the printing device after a specified duration of time.

The method 300 further includes providing the at least one inactive printing device with non-persistent connection information via the persistent connection, at 330. For example, connection instructions 122 of FIG. 1 or connection module 222 may provide the inactive printing device with information for establishing a non-persistent connection with the cloud server (e.g., cloud server 102, 202). In certain examples, a HTTP URL is provided to the inactive printing device.

Method 300 includes receiving a polling message from the at least one inactive printing device via the non-persistent connection, at 340. For example, polling message receiving instructions 123 of FIG. 1 or polling message receiving module 223 of FIG. 2 may receive polling messages from the inactive printing device over the non-persistent connection, at a specified frequency.

Method 300 also includes sending a bitmap to the at least one inactive printing device in response to the polling message, at 340. In some examples, the bitmap includes at least one bit to indicate when the at least one inactive printing device is to become active and switch to the persistent connection. The bitmap is sent via the non-persistent connection. For example, job request notification instructions 124 of FIG. 1 or job request notification module 224 of FIG. 2 may send bitmap 234 to the inactive printing device in response to the poling message from the inactive printing device. If a bit in the bitmap 234 corresponding to the inactive printing device is enabled/set, then the inactive printing device is to switch to an active state and switch to the persistent connection.

Figure 4:
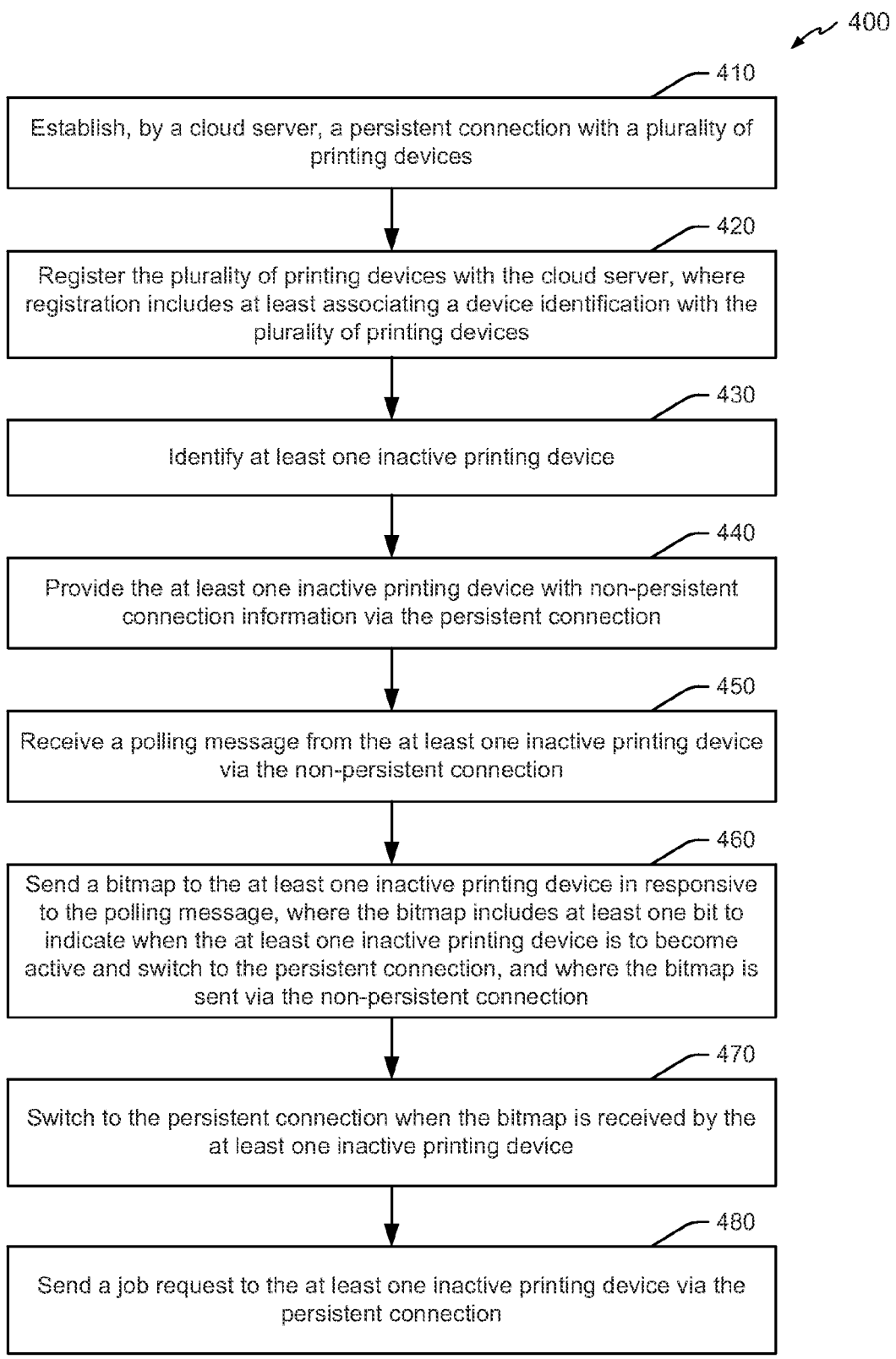
FIG. 4 is a flowchart of a method of establishing a connection between a cloud server and a plurality of printing devices, according to one example.

FIG. 4 is a flowchart of a method of establishing a connection between a cloud server and a plurality of printing devices, according to one example. Although execution of method 400 is described below with reference to the components of cloud servers 102 and 202 of FIGS. 1 and 2, respectively, other suitable components for execution of method 400 will be apparent to those of skill in the art. Additionally, the components for executing method 400 may be spread among multiple devices. Method 400 may be implemented in the form of executable instructions stored on a machine-readable storage medium, such as non-transitory machine-readable storage medium 120 of FIG. 1, and/or in the form of electronic circuitry.

Method 400 includes establishing, by a cloud server, a persistent connection with a plurality of printing devices, at 410. For example, cloud server 101, 202 may establish a persistent XMPP connection the plurality of printing devices 204a-204n. Cloud server 102, 202 may manage printing devices 204a-204n and/or provide cloud solutions to the printing devices 204a-204n. In some examples, the persistent XMPP connection may be secured using transport layer security (TLS) protocol for encryption of content exchanged between the cloud server 102,202 and the printing devices 204a-204n, and authentication may be based on simple authentication and security layer (SASL) standard.

Method 400 further includes registering the plurality of printing devices with the cloud server, at 420. In some examples, the registration process includes at least associating a device identification with the printing devices. For example, as part of the registration of the printing devices 204a-204n with the cloud server 102, 202, each printer is provided a unique JabberID. Thus, each printer connects to the cloud server 102, 202 using its JabberID.

Method 400 includes identifying at least one inactive printing device, at 430. For example, the cloud server 102, 202 identifies at least one inactive printing device from the plurality of printing devices 204a-204n connected thereto. Method 400 includes providing the at least one inactive printing device with non-persistent connection information via the persistent connection. For example, printing devices that do not send a ping packet to the cloud server 102, 202 after a specified duration of time may be identified as inactive. Method 400 includes providing the at least one inactive printing device with non-persistent connection information via the persistent connection, at 440. For example, the inactive printing devices are provided with a HTTP URL over the persistent connection.

Method 400 includes receiving a polling message from the at least one inactive printing device via the non-persistent connection, at 450, and sending a bitmap to the at least one inactive printing device in response to the polling message, at 460. In certain examples, the bitmap includes at least one bit to indicate when the at least one inactive printing device is to become active and switch to the persistent connection. Method 400 also includes switching to the persistent connection when the bitmap is received by the at least one inactive printing device, at 470. For example, the cloud server 102, 202 reestablishes the persistent connection with the inactive printing device once the bitmap instructing the inactive printing device to become active has been received.

Method 400 further includes sending a job request to the at least one inactive printing device via the persistent connection, at 480. For example, at least one of a print job, copy job, scan job, etc may be sent from the cloud server 102, 202 to the inactive printing device over a persistent connection. It should be noted that other management instructions may be sent to the inactive printing device.

In the foregoing description, numerous details are set forth to provide an understanding of the present disclosure. However, it will be understood by those skilled in the art that the present disclosure may be practiced without these details. While the disclosure has been described with respect to a limited number of examples, those skilled in the art will appreciate numerous modifications and variations therefrom. It is intended that the appended claims cover such modifications and variations as fall within the true spirit and scope of the disclosure.

What is claimed is:

1. A cloud server computing device comprising:
   a processor to:
   identify at least one inactive printing device having a persistent connection with the cloud server computing device;
   provide the at least one inactive printing device with non-persistent connection information via the persistent connection;
   receive a polling message from the at least one inactive printing device via the non-persistent connection; and
   send an instruction to the at least one inactive printing device to return to an active state when a job request is available for the at least one inactive printing device.

2. The cloud server computing device of claim 1, the processor further to send the job request to the at least one inactive printing device via the persistent connection.

3. The cloud server computing device of claim 1, wherein the instruction comprises a bitmap to indicate when the at least one inactive printing device is to be active and switch to the persistent connection.

4. The cloud server computing device of claim 3, wherein the bitmap comprises at least one bit that identifies the at least one inactive printing device of a plurality of printing devices, and wherein the at least one bit is set to indicate when the at least one inactive printing device is to be active and switch to the persistent connection.

5. The cloud server computing device of claim 4, wherein the bitmap is compressed using a run-length encoding (RLE) technique, the processor further to send the compressed bitmap to a content delivery network (CDN) for delivery to the at least one inactive printing device.

6. The cloud server computing device of claim 1, wherein the persistent connection comprises an extensible messaging and presence protocol (XMPP) connection.

7. The cloud server computing device of claim 6, wherein the XMPP connection comprises a secure XMPP connection.

8. The cloud server computing device of claim 1, wherein the non-persistent connection information comprises a hypertext transfer protocol (HTTP) uniform resource locator (URL).

9. The cloud server computing device of claim 1, wherein the non-persistent connection information specifies a polling frequency at which the at least one inactive printing device is to send the polling message to the cloud server computing device.

10. The cloud server computing device of claim 1, wherein the polling message comprises an HTTP GET request.

11. The cloud server computing device of claim 1, the processor further to identify the at least one inactive printing device when a ping packet is not received from the at least one inactive printing device within a threshold time.

12. The cloud server computing device of claim 1, the processor further to:
   identify at least one printing device of a plurality of printing devices as active based on receipt of a ping packet from the at least one active printing device within a threshold time; and
   maintain the persistent connection with the at least one active printing device.

13. The cloud server computing device of claim 1, the processor further to:
   register a plurality of printing devices with the cloud server computing device, wherein the plurality of printing devices includes the at least one inactive printing device;
   provide each of the plurality of printing devices with a device identification usable by the plurality of printing devices for connecting with the cloud server computing device.

14. A method of establishing a connection between a cloud server and a plurality of printing devices, comprising:
   identifying at least one inactive printing device having a persistent connection with the cloud server;
   providing the at least one inactive printing device with non-persistent connection information via the persistent connection;
   receiving a polling message from the at least one inactive printing device via the non-persistent connection; and
   responsive to receiving the polling message, sending a bitmap to the at least one inactive printing device, wherein the bitmap includes at least one bit to indicate when the at least one inactive printing device is to become active and switch to the persistent connection, and wherein the bitmap is sent via the non-persistent connection.

15. The method of claim 14, further comprising switching to the persistent connection when the bitmap is received by the at least one inactive printing device.

16. The method of claim 15, further comprising sending a job request to the at least one inactive printing device via the persistent connection, wherein the job request comprises at least one of a print job, a scan job, a facsimile job, and a copy job.

17. The method of claim 14, further comprising sending the bitmap to a content delivery network (CDN), wherein the CDN is to deliver to the bitmap to the at least one inactive printing device.

18. The method of claim 14, further comprising:
establishing a persistent connection with a plurality of printing devices including the at least one inactive printing device;
registering the plurality of printing device with the cloud server, wherein registering the plurality of printing devices includes at least associating a device identification with the plurality of printing devices.

19. A non-transitory computer-readable medium comprising instructions that, when executed by a processor in a cloud server, cause the cloud server to:
identify at least one inactive printing device having a persistent connection with the cloud server;
provide the at least one inactive printing device with non-persistent connection information via the persistent connection;
receive a polling message from the at least one inactive printing device via the non-persistent connection; and
send an instruction to the at least one inactive printing device to return to an active state when a job request is available for the at least one inactive printing device.

20. The non-transitory computer-readable medium of claim 19, wherein the persistent connection comprises a secure extensible messaging and presence protocol (XMPP) connection and wherein the non-persistent connection information comprises a hypertext transfer protocol (HTTP) uniform resource locator (URL).

* * * * *